C. Finn,
Bee Hive.
No. 102,526.  Patented May 3, 1870.
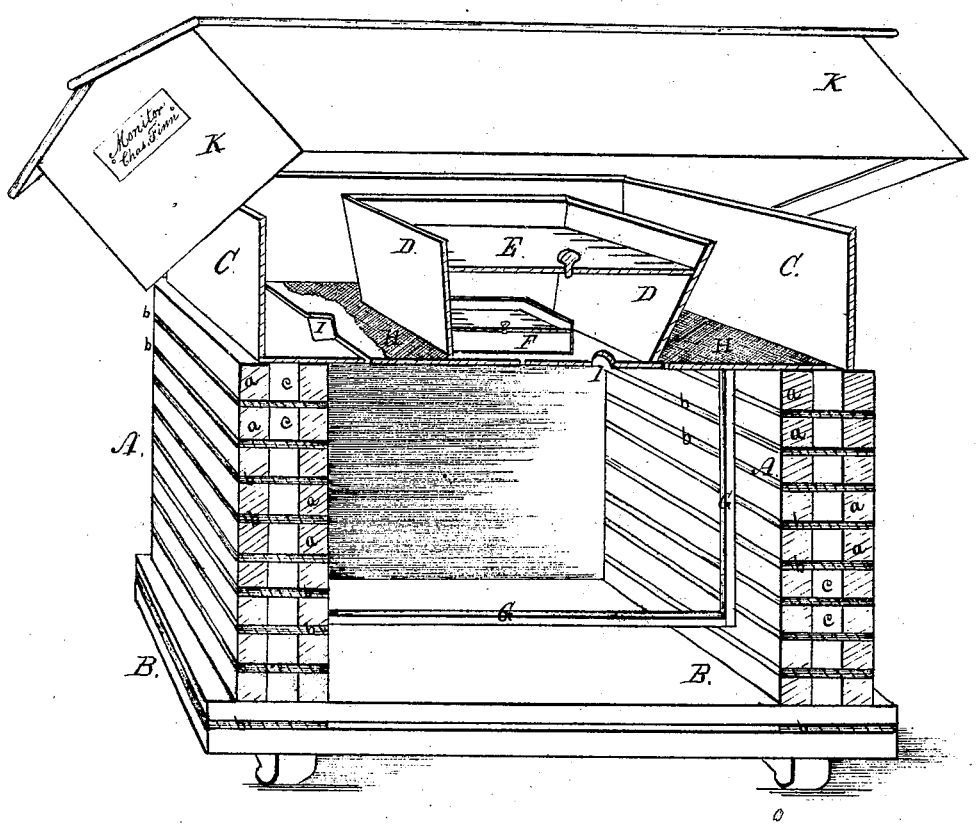
Witnesses.
Corydon E. Fuller
Lewis A. Brown
Inventor.
Charles Finn

United States Patent Office.

CHARLES FINN, OF DES MOINES, IOWA.

Letters Patent No. 102,526, dated May 3, 1870.

IMPROVEMENT IN BEE-HIVES.

The Schedule referred to in these Letters Patent and making part of the same.

I, CHARLES FINN, of Des Moines, in the county of Polk and State of Iowa, have invented certain Improvements in Bee-Hives, of which the following is a specification.

I have thirty-two years of experience in keeping bees, and have had a hundred swarms at one time, and I have studied the nature and habits and wants of the bee very attentively.

In the multitude of hives invented, there is not one, in my humble opinion, well adapted to preserve an even temperature, to keep the bees warm in winter and cool in summer, and to afford proper ventilation.

My invention is designed—

First, to keep the bees warm in winter, in any climate, without the necessity of burying them under ground, or removing them to cellars, or to encase them with straw, and other common and troublesome methods resorted to.

Second, to keep the bees and honey cool in the heat of summer.

Third, to provide a proper ventilation at all times.

Fourth, to provide a feeding-box that is safe and accessible to the bees and to the keeper at all times.

Fifth, to protect the young broods from the sudden changes of the atmosphere, by keeping an even temperature in the hives at all times.

The drawing is a perspective view of a half section of my hive, showing the roof entire.

A A is the wall of my hive, composed of the parallel wooden rounds $a\ a$ and the layers of paper $b\ b$, alternating between the layers or rounds of wood.

The vacant spaces $c\ c$ thus formed may be filled with straw, chaff, or any other material adapted for the purpose.

Felting, or straw rolled in paper or cloth, or any other porous material that will absorb moisture and retain warmth, may be used in place of the layers of paper.

These rounds of wood and layers of paper are permanently nailed together.

I am aware that straw hives are in use, and that wooden hives have been covered with straw; but by my method the straw or its substitute is completely concealed and inaccessible to moth.

B B is the bottom, which is double, with a hollow chamber, provided in the same manner and for the same purposes as the spaces $c\ c$ in the walls.

C C is my ventilator or chaff-box, combined with my feed-box D D.

This ventilator or chaff-box can be removed whenever desired, and honey-boxes put in its place.

D D is the feed-box.

E is a wooden cover to the feed-box, which may be cushioned or covered with a straw pad or a bag of chaff.

F is a box containing food or water, or food and water. This box may be double, one apartment designed for food and the other for water, or two separate vessels or boxes may be used to hold food and water.

G is a frame, such as are in common use. As many as are required can be put in the space designed for them.

H H is the bottom of my combined ventilator and feed-box, and is made of any textile fabric sufficiently open to admit of the passage of air and steam, and close enough to prevent the passage of chaff.

It is permanently attached to the bottom of the frame of the chaff-box C C.

I I shows openings in the movable wooden cover of the hive.

The bottom of the chaff-box is cut away on the left side, showing one of the openings I through which the bees pass to the honey-boxes when they are occupying the place of the chaff-box.

When the chaff-box is in its place all the passages for the bees will be closed, excepting the one leading to the feed-box.

The open space around the feed-box D D, and within the chaff-box, is designed to be filled with chaff, or any material that can be substituted therefor.

K K is the roof, made of wooden boards.

By this means I provide a feed-box which is at all times accessible to the bees, and also to the keeper, and which will not be subject to frost, and which at all times provides a means of carrying off steam.

The steam may condense on the inside of the roof, but there it can do no harm to the bees.

The joints in the roof are not air-tight, and afford sufficient escape for air and steam.

The form and size of my hive may be varied as desired.

My combined ventilator and feed-box, together or separately, may be used advantageously with most of the hives now in use.

Claims.

I claim as my invention—

1. Constructing a bee-hive with hollow walls, by alternating layers of wood and paper, or their equivalents, substantially as described and for the purposes specified.

2. The ventilator composed of a chaff-box, substantially as described, and for the purposes specified.

3. The feed-box, combined with the ventilator or chaff-box, substantially as described and for the purposes specified.

CHARLES FINN.

Witnesses:
CORYDON E. FULLER,
LEWIS J. BROWN.